(12) United States Patent
Chida

(10) Patent No.: US 8,600,029 B2
(45) Date of Patent: Dec. 3, 2013

(54) CALLER INFORMATION NOTIFIER SYSTEM FOR USE IN CALLBACK WITH A CALLBACK NUMBER DIFFERENT FROM A CALLER PHONE NUMBER

(75) Inventor: Koichi Chida, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1153 days.

(21) Appl. No.: 12/458,392

(22) Filed: Jul. 10, 2009

(65) Prior Publication Data

US 2010/0040216 A1 Feb. 18, 2010

(30) Foreign Application Priority Data

Aug. 18, 2008 (JP) .................... 2008-209801

(51) Int. Cl.
*H04M 3/42* (2006.01)
*H04W 40/00* (2009.01)

(52) U.S. Cl.
USPC ............. 379/207.08; 379/93.01; 379/207.15; 379/201.1; 379/88.17; 455/445

(58) Field of Classification Search
USPC ............... 379/93.01, 207.15, 201.1, 88.17, 379/207.08; 455/445
See application file for complete search history.

(56) References Cited

U.S. PATENT DOCUMENTS

| | | | | |
|---|---|---|---|---|
| 5,155,761 A | * | 10/1992 | Hammond | 379/88.2 |
| 6,269,149 B1 | * | 7/2001 | Hassell et al. | 379/1.01 |
| 6,396,906 B1 | * | 5/2002 | Kaplan | 379/67.1 |
| 6,603,846 B1 | * | 8/2003 | Cannon et al. | 379/142.06 |
| 6,724,885 B1 | * | 4/2004 | Deutsch et al. | 379/265.02 |
| 7,145,998 B1 | * | 12/2006 | Holder et al. | 379/210.01 |
| 2003/0063732 A1 | * | 4/2003 | Mcknight | 379/210.01 |
| 2006/0009266 A1 | * | 1/2006 | Hara et al. | 455/572 |
| 2007/0054659 A1 | * | 3/2007 | Chou et al. | 455/417 |
| 2007/0115928 A1 | | 5/2007 | Benco et al. | |
| 2007/0232351 A1 | * | 10/2007 | Scalisi et al. | 455/554.2 |
| 2008/0090550 A1 | * | 4/2008 | Scalisi et al. | 455/406 |
| 2008/0205608 A1 | * | 8/2008 | Tal et al. | 379/93.01 |
| 2008/0226055 A1 | * | 9/2008 | Holder et al. | 379/210.01 |

FOREIGN PATENT DOCUMENTS

| | | |
|---|---|---|
| JP | 2004-088796 | 3/2004 |
| JP | 2006-237751 | 9/2006 |
| JP | 2007-074443 | 3/2007 |
| JP | 2007-251622 A | 9/2007 |
| WO | WO-2007/056092 A1 | 5/2007 |

* cited by examiner

*Primary Examiner* — Lisa Hashem
(74) *Attorney, Agent, or Firm* — Rabin & Berdo, P.C.

(57) ABSTRACT

In a caller information notifier system, a calling terminal transmits a calling signal having a phone number for callback inserted which is different from the phone number of the calling terminal. When a callback is tried from a called terminal, a communication network server, where the calling signal passes, determines the relationship between the phone number of the calling terminal and the phone number for callback inserted in the calling signal to authenticate the phone number for callback. A terminal which receives the calling signal extracts the phone number for callback from the calling signal and keeps the extracted number as a callback phone number. The callback phone number is, for instance, an FMC service number. The probability of success in reaching a caller is thereby increased.

11 Claims, 5 Drawing Sheets

15A

| SUBSCRIBER ID INFORMATION | FMC SERVICE NUMBER | REDIRECTION NUMBER | REDIRECTION FLAG |
|---|---|---|---|
| B | 1-xxx-xxxxxxx | 1-yyy-yyyyyyy | O |
| | | 1-zzz-zzzzzzz | |
| C | 1-aaa-aaaaaaa | 1-yyy-yyyyyyy | O |
| | | 1-bbb-bbbbbbb | |
| | | | |

ABSTRACT CONVERSION FOLLOWS:

CALLER INFORMATION NOTIFIER SYSTEM FOR USE IN CALLBACK WITH A CALLBACK NUMBER DIFFERENT FROM A CALLER PHONE NUMBER

BACKGROUND OF THE INVENTION

1. Field of the Invention

The present invention relates to a caller information notifier system, and more in particular to a caller information notifier system applicable to, for example, providing advanced services in the fixed mobile convergence (FMC) environment for telecommunications systems, such as plain old telephone and videophone systems. The invention also relates to a method of notifying caller information.

2. Description of the Background Art

Conventionally, some types of communications terminals are adapted to display, when a call terminates thereon, the phone number of a caller having originated the call or the name of the caller stored therein in association with the phone number, regardless of whether the call comes over a circuit-switching or IP (Internet Protocol) packet-switching network, as disclosed by Japanese patent laid-open publication Nos. 2006-237751 and 2004-88796. The called party can take notes of the displayed phone number to thereby call it back.

Another solution is available in which a terminal, when called, stores the phone number of a caller and is responsive to operation of the called party to present the stored number so as to facilitate a callback procedure, as taught by Japanese patent laid-open publication No. 2007-74443.

However, when a callback is made to a call having originated from a fixed-line or landline phone while the caller is not available because of absence from the vicinity of the phone, the caller cannot answer the callback.

Onto the users to whom the FMC service is available, calls may terminate by dialing an FMC one-number to thereby allow the call to terminate on, for instance, a fixed-line phone or a mobile phone, depending upon the presence information. When a called party calls back such a user, the called party cannot use an FMC one-number for the callback because the called party is presented with the phone number for callback which is assigned to the calling terminal when having originated the call.

SUMMARY OF THE INVENTION

It is an object of the invention to provide a caller information notifier system which is improved in probability of success in reaching a caller when a callback is tried from a called terminal.

In accordance with the present invention, a caller information notifier system for use in a telecommunications network comprises a callback number notifier for notifying a called terminal, on which a call is to terminate, of a phone number for callback that differs from a phone number of a calling terminal which originated the call.

Also in accordance with the present invention, a communications terminal for use in a telecommunications network for transmitting a calling signal comprises a callback number inserting circuit for inserting into the calling signal a phone number for callback that differs from a phone number of the communications terminal.

Further in accordance with the present invention, a communication network server for use in a telecommunications network for passing a calling signal comprises a callback number authenticator for determining a relation between a phone number of a terminal which sent out the calling signal and a phone number for callback, when inserted in the calling signal, to authenticate the phone number for callback.

In accordance with the present invention, a communications terminal for use in a telecommunications network for receiving a calling signal comprises a callback number holding circuit for retrieving a phone number for callback, when inserted in the calling signal, to hold the retrieved number as a phone number for callback.

Further in accordance with the invention, a method of notifying caller information in a telecommunications network, comprising the steps of: originating a call by a calling terminal to a called terminal; terminating the call on the called terminal; disconnecting the call without answering; and notifying the called terminal of a phone number for callback that differs from a phone number of the calling terminal.

Thus, the present invention can improve the probability of reaching the caller when a callback is made by the called terminal. In the context, the term "caller" or "calling party or terminal" is generally referred to a user or terminal first originating a call meant for a called party or terminal but failing to reach the called party or user. That is to say, the caller, or calling party or terminal is to be called back later on by the called party or terminal. Also in the context, a party or terminal on which a call is terminated or is to be terminated may be referred to as a called party or terminal, or a party or terminal to be called.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

A preferred embodiment of the caller information notifier system in accordance with the present invention will now be described in detail with reference to the accompanying drawings. The caller information notifier system in this embodiment is applicable to a fixed mobile convergence (FMC) service system for providing so-called one-number service.

Figure 1:
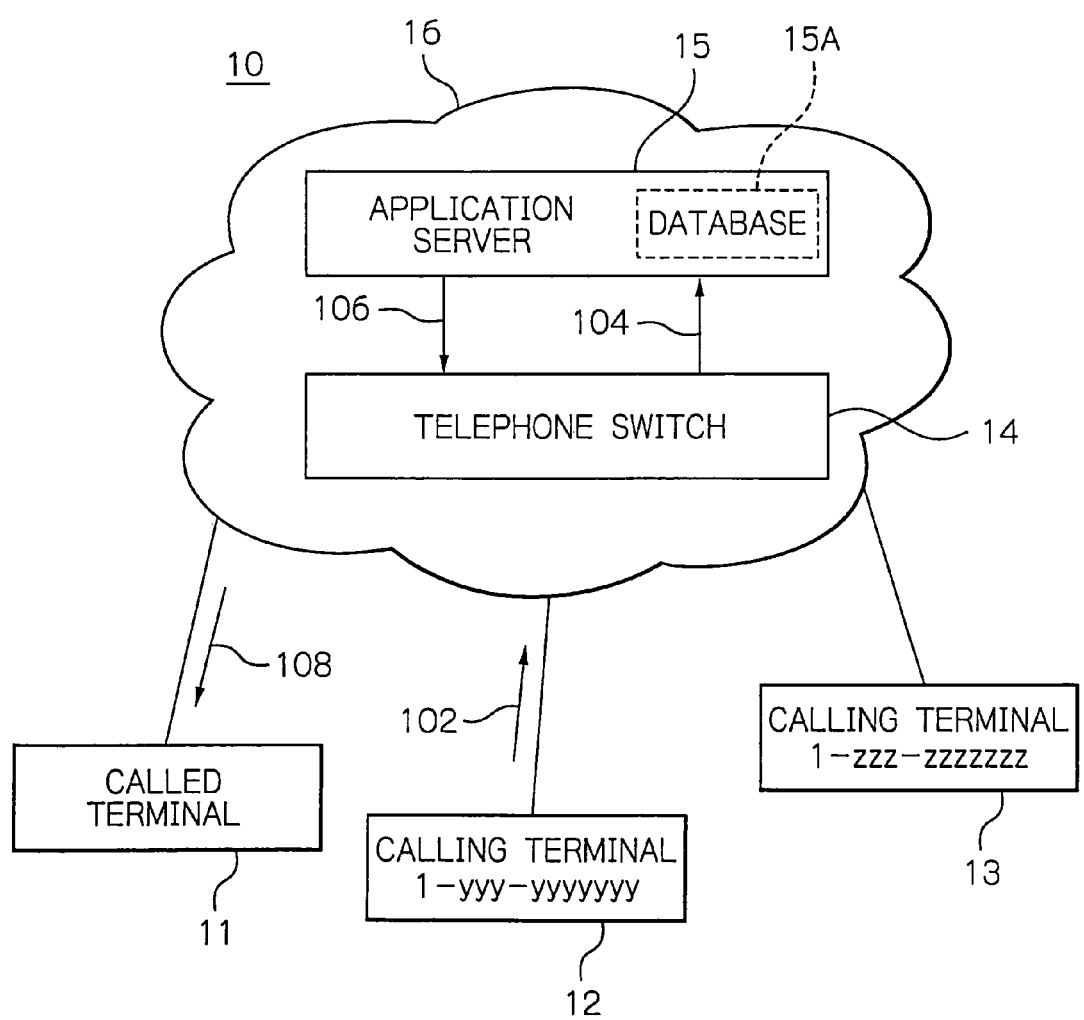
FIG. 1 is a schematic system diagram showing an example of FMC service system implementing a caller information notifier system in accordance with a preferred embodiment of the present invention together with a flow of information in the system.

FIG. 1 schematically shows in a system diagram an FMC service system 10 implementing a caller information notifier system according to a preferred embodiment, together with a flow of information in the system. Among a number of telecommunications terminals having the telephony function in the FMC service system 10, the figure specifically shows three telecommunications terminals 11, 12 and 13.

Figure 4:
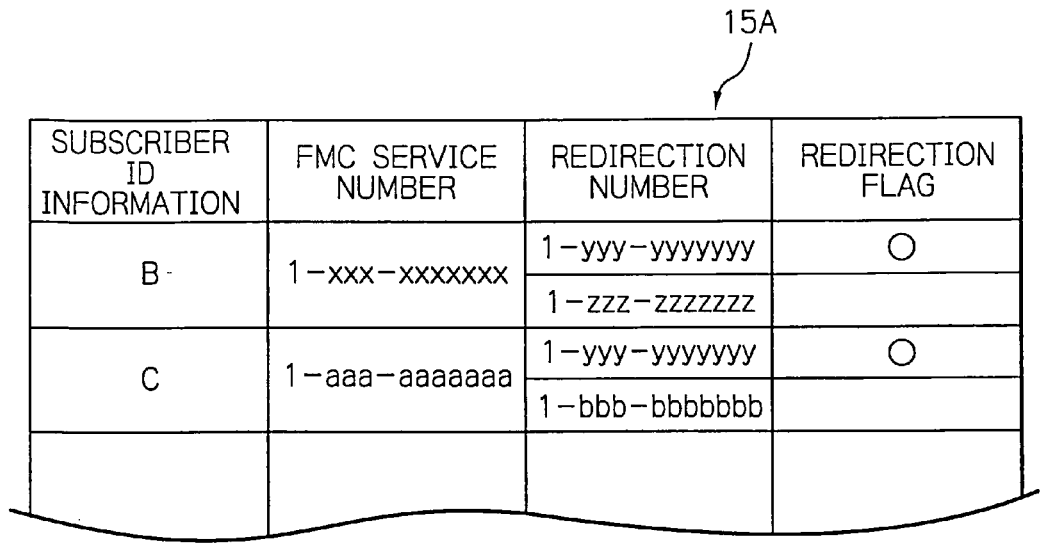
FIG. 4 is explanatorily shows the data items of a database on FMC service subscribers in the preferred embodiment.

The terminals 11, 12 and 13 are adapted for use in communications services including the plain old telephone service (POTS), advanced telephony service, videophone service and similar services. For illustration only, the terminal 11 is associated with a called party or a user to be called A, and the other terminals 12 and 13 are associated with the same calling party, namely, both terminals 12 and 13 take the role of calling terminals, e.g. owned by the same user B subscribing to an FMC service. For illustration purpose, the terminals 12 and 13 are allotted to phone numbers 1-yyy-yyyyyyy and 1-zzz-zzzzzzz, respectively, as shown in FIGS. 1 and 4.

The calling terminal 12 and the called terminal 11 are herein fixed-line or landline phones, but may not be restricted thereto. The calling terminal 13 and the called terminal 11 may be designed for use in communications provider environments different from each other, e.g. subscribing to either of a circuit switching (CS) network or a packet switching (PS) network. In the illustrative embodiment, the calling terminal 12 subscribes for a PS network and is operative as a SIP (Session Initiation Protocol) client. For example, the CS network may be a public switched telephone network (PSTN) or a 3G (Third Generation) mobile network, and the PS network may be an IP (internet protocol) telephony network on a Wi-Fi (Wireless Fidelity, trade name) broadband connection or equivalent.

The telecommunications network 16 where the terminals 11, 12 and 13 belong to may consist of a sole communications provider or common carrier, or may be an interconnection of several providers or common carriers to form a telecommunications network. In the telecommunications network 16, a telephone switching system 14 is included for providing the FMC service, and an application server 15 interconnected with the switching system 14.

Figure 2:
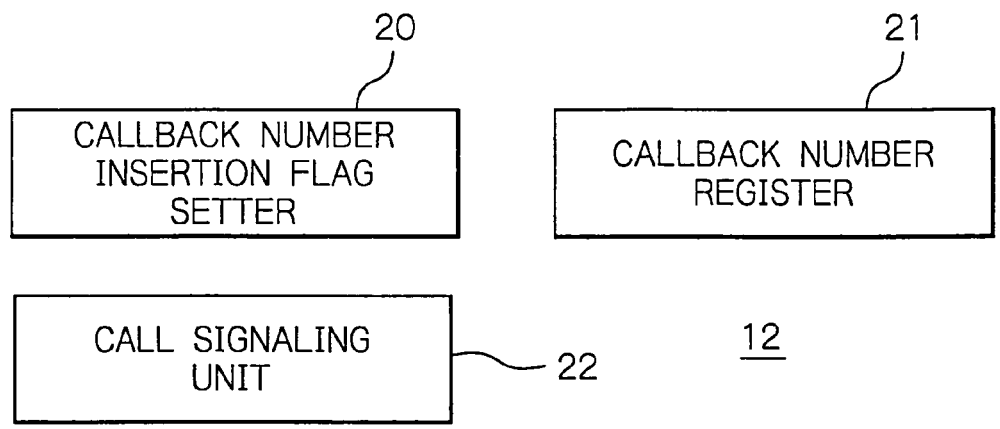
FIG. 2 is a schematic block diagram showing the internal functions of a calling terminal in terms of caller identification notification in the preferred embodiment shown in FIG. 1.

FIG. 2 is a schematic block diagram representatively showing the internal structure of the calling terminal 12 in terms of caller identification notification. As shown in the figure, the calling terminal 12 includes a callback number insertion flag setter 20, a callback number register 21 and a call signaling unit 22. The other calling terminal 13 may be the same in structure as the terminal 12.

The callback number insertion flag setter 20 is operable to set a callback number insertion flag to its ON or OFF state and hold its setting, the flag being indicative of whether to insert a callback number into a call-originating, or calling, signal. The calling signal basically includes the telephone number of the calling terminal 12, i.e. caller number. The callback number insertion flag is to specify whether or not a telephone number for use in making a callback, i.e. callback number, should be included in the calling signal in addition to the caller number. Many telephone terminals are equipped with simplified voice mail function. The callback number insertion flag can be set in a manner, for instance, similar to or operative with enabling/disenabling the simplified voicemail function on a telephone handset. Alternatively, the calling terminal 12 may be equipped with a one-touch key for easily switching the ON/OFF state of the insertion flag.

The callback number register 21 is adapted to store a callback number to be inserted into the calling signal. By way of example, the calling terminal 12 may be adapted to be responsive to the callback number insertion flag being set to its ON state to urge the user to newly input a callback number on the terminal 12 to store the callback number in the callback number register 21. Alternatively, the calling terminal 12 may be adapted to keep the data stored when the callback number insertion flag is changed to its OFF state, and to display, when the flag is changed to its ON state again, the stored callback number to inquire the user as to whether to use this callback number. If the user intends to change the number, he/she may input a new number to store it in the callback number register 21.

The user may be allowed to assign any callback number. In that case, the caller number may be or may not be set as a callback number. Furthermore, numbers to be assigned to a callback number may be restricted to ones suitable or appropriate for callback. For example, the restriction may be imposed such that only an FMC one-number or FMC service number starting with a prefix "1-" can be used as the callback number.

The call signaling unit 22 is dedicated to form a calling, or call-originating, signal when the user A originates a call and send out the calling signal to the telecommunications network 16. When forming the calling signal, the call signaling unit 22 checks whether or not the callback number insertion flag is set to its ON state in the callback number insertion flag setter 20, and, if the flag is in its ON state, then incorporates the callback number stored in the callback number register 21 into the calling signal. By way of example, if the calling terminal 12 is operative under the SIP protocol, the calling signal formed by the call signaling unit 22 is an INVITE request, which has its optional header reserved for use in storing a callback number. In the option header, the callback number will be inserted.

The telephone switching system 14 may advantageously be a central-office telephone switch or a server such as SIP server which is adapted to establish communication calls or paths between the called terminal 11 and the calling terminal 12. The communication calls or paths may sometimes be established through several switches and servers. However, FIG. 1 simply shows the single telephone switch 14 for use in providing the FMC service.

Figure 3:
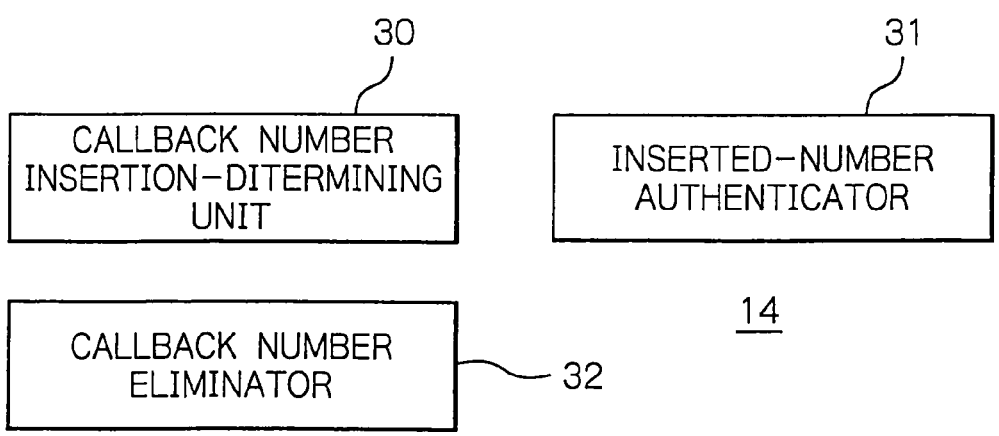
FIG. 3 is a schematic block diagram showing the internal function of a telephone switch in terms of caller identification notification in the preferred embodiment.

FIG. 3 is a schematic block diagram showing the internal structure of the telephone switch 14 in terms of caller identification notification. In this figure, the telephone switch 14 includes a callback number insertion determiner 30, an inserted-number authenticator 31 and a callback number eliminator 32.

The callback number insertion determiner 30 is adapted to receive a calling signal, e.g. delivered by the calling terminal 12, and determine whether or not a callback number is inserted in the received signal.

The inserted-number authenticator 31 is operative in response to the callback number insertion determiner 30 having determined a callback number inserted in the calling signal to be cooperative with the application server 15 in authenticating the inserted callback number or signal.

The callback number eliminator 32 is designed to eliminate the callback number from a calling signal if the callback number is determined as inserted in the calling signal but not authenticated. Otherwise, namely, when no callback number is inserted in a calling signal or when a callback number is determined as inserted in a calling signal and authenticated, the callback number eliminator 32 keeps the callback number or signal contained in the calling signal. For instance, the callback number eliminator 32 deletes the callback number inserted in the optional header for use in callback number insertion or the optional header itself. Alternatively, instead of deleting the callback number, the eliminator 32 can overwrite the caller number with the callback number.

The telephone switching system 14 may be of the type having the functions similar to those of a conventional telephone switching system except for the callback number insertion determiner 30, the inserted-number authenticator 31 and the callback number eliminator 32 thus added.

FIG. 4 exemplarily shows how data fields are provided in an FMC service subscriber database 15A on the application server 15. As shown in the figure, the FMC service subscriber database 15A contains data on, e.g. subscriber identification (ID) information about the name, nickname or the like of subscribers and the FMC service numbers specifically assigned to subscribers such as phone numbers starting with a prefix, e.g. "1-", one or more candidates for a number to which a call is to be forwarded, and call forwarding destination flags indicative of which of the candidates for a number is currently for use in call forwarding, or redirection.

By way of example in FIG. 4, a subscriber B has an FMC service number of "1-xxx-xxxxxxx" and candidates for number for call forwarding of "1-yyy-yyyyyyy" and "1-zzz-zzzzzzz". As a candidate for number currently predominant, the number "1-yyy-yyyyyyy" is flagged.

The inserted-number authenticator 31, for example, supplies the application server 15 with a caller number included in a received calling signal to retrieve therefrom an FMC service number associated with the caller number, thereby authenticating the callback number when corresponding to the FMC service number. Alternatively, the inserted-number authenticator 31 may supply the application server 15 with the caller number and the callback number (FMC service number) contained in the received calling signal, and the application server 15 in turn determines whether or not the caller and callback numbers, or FMC service number, thus supplied are associated with one and the same subscriber to feed back a result from the determination to the authenticator 31. The authenticator 31 then authenticates or certifies the callback number based on the determination result.

Figure 5:
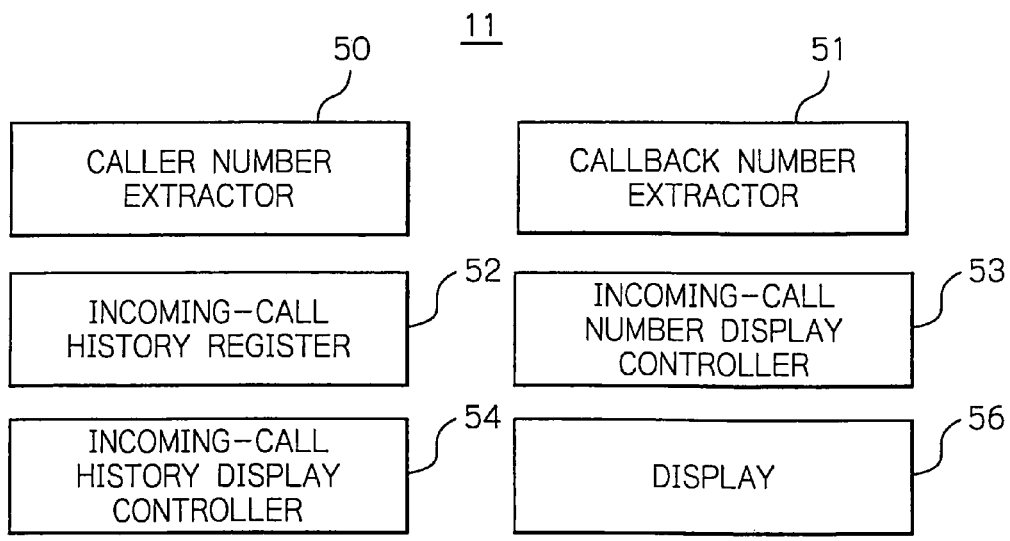
FIG. 5 is a schematic block diagram showing the internal functions of a called terminal in terms of caller identification notification in the preferred embodiment.

FIG. 5 is a schematic block diagram showing the internal structure of the called terminal 11 in terms of caller identification notification. In the figure, the called terminal 11 comprises a caller number extractor 50, a callback number extractor 5i, an incoming-call history register 52, an incoming-call number display controller 53 and an incoming-call history display controller 54.

The caller number extractor 50 is adapted to extract a caller number from a received calling signal. If the extraction or display of a caller number is refused, i.e. the caller number is not set as notified, the caller number extractor 50 does not execute the extraction.

The callback number extractor 51 is dedicated to extract a callback number when contained in a received calling signal. The calling signal may have a callback signal inserted even when a call is originated on the calling number identification restriction service.

The incoming-call history register 52 is configured to, for instance, keep a predetermined number of events on a call history. The register 52 may be adapted to hold only the latest event on the history. In the illustrative embodiment, each of "call history events" may include (a) a record of "caller-ID-blocked call" if the caller number in a received calling signal is not notified, (b) a "caller number" if only the caller number is extracted from a received calling signal, or (c) "a set of caller and callback numbers" if the caller and callback numbers are extracted from a received calling signal. Note that, in the cases (b) and (c), the address book function of the called terminal 11 can be used to add additional information such as the name and nickname of the caller to the call history.

The incoming-call number display controller 53 is adapted to display, upon receipt of an calling signal, number information on a caller identification contained in the calling signal. By way of example, the called terminal 11 has its display screen 56 which may indicate in the aforementioned case (a) that "the caller is unknown". In cases (b) and (c), the display screen 56 shows the "caller number" and the "caller and callback numbers", respectively. In case (c), the caller and callback numbers may be displayed together, or one of these numbers may be displayed first and the other may be displayed by allowing the subscriber A to manipulate a display control, e.g. a cursor key, not shown, of the terminal 11 to thereby change the number display. Alternatively in case (c), either of the caller and callback numbers may be so fixedly displayed as not to be shifted to the other on display. It is to be noted that the incoming-call number display controller 53 may show the name and/or nickname of the caller instead of or in addition to the caller number.

The incoming-call history display controller 54 is operative in response to a request from the called user A to display a list of incoming-call events or the latest incoming-call event in the call history. Like in the cases of the incoming-call number display controller 53, the display screen 56 indicates a history appropriate to each case of (a), (b) and (c). Specifically, the incoming-call history display controller 54 indicates on the display screen 56 that "the caller ID is blocked" in case (a), a "caller number" in case (b) and "caller and callback numbers" in case (c). Concerning case (c), the caller and callback numbers maybe displayed together, or one of these numbers may be displayed first and allowing the subscriber A to change a number to be displayed to the other by the display change control key. Alternatively, the callback number may be so fixedly displayed that it cannot be changed to the other number. The incoming-call history display controller 54 places the cursor on any one of call history events when displayed on the call history list. In addition, the incoming-call history display controller 54 may display, instead of or in addition to the caller number, the name and/or nickname of a person to whom a callback is to be made.

The incoming-call history display controller 54 is also adapted to be responsive to a call request given in a situation where a call event on the incoming-call history is specified, e.g. the cursor is positioned on a specific incoming-call event or the latest incoming-call event to provide a phone number to be called to a call controller, not shown, of the terminal 11. In case (a), however, such a call request will be ignored when a call event on the incoming-call history is specified. When a call event on the incoming-call history is specified in case (b), a caller number listed on the incoming-call history is provided as a phone number to be called. If a call event on the incoming-call history is specified in case (c), the callback number listed on the incoming-call history is supplied as a phone number to be called.

Furthermore, in the situation where a call event on the incoming-call history is specified, i.e. the cursor is positioned on a specific event or the latest event on the incoming-call history, a manipulation on address book registration will cause the incoming-call history display controller 54 to shift its control to the address book registering. In this case, several phone numbers may be registered as items in one record of the address book, or phone numbers may be registered separately from callback numbers. When shifting to the address book registering operation, if a call event on the incoming-call history includes a caller and a callback number, then the incoming-call history display controller 54 automatically inputs these numbers to the columns allotted to phone and callback numbers in a record to be registered in the address book while leaving other columns for caller name and the like in blank to thereby allow the user to fill the blank columns.

Now, the operation of the FMC service system 10 will be described in relation to a callback procedure according to the illustrative embodiment. Assume that, in considering the possibility that the user or caller B who is a subscriber to the FMC service may not always stay in close proximity to the calling terminal 12 but may return within reach of the calling terminal 13, the calling terminal 12 is set to have a calling signal 102, FIG. 1, include a callback number consisting of an FMC one-number "1-xxx-xxxxxxx" in addition to its caller number "1-yyy-yyyyyyy", that is, the callback number insertion flag is set in its ON state, as shown in FIG. 4.

When the user B operates the calling terminal 12 to originate a call to the called terminal 11, the calling terminal 12 inserts the callback number registered in the callback number register 21 into a calling signal 102 according to the callback number insertion flag which is set to its ON state by the callback number insertion flag setter 20.

The calling signal 102 is then transmitted to the telephone switch 14. Since the calling signal 102 includes the callback number, the switch 14 is in turn in cooperation with the application server 15 to authenticate the callback signal or number inserted in the calling signal 102, as depicted with a line 104 in FIG. 1.

When the relation between the caller and callback numbers included in the received calling signal 102 is determined to be proper by going through the data stored in the FMC service subscriber database 15A, the telephone switch 14 gets an authentication or certification 106 of the callback number acceptable and then switches the calling signal 108 to the called terminal 11 without eliminating the callback number therefrom. Thus, the calling signal 108 includes the FMC one-number "1-xxx-xxxxxxx" and the caller number "1-yyy-yyyyyyy". As above, signals are designated with connections on which they are conveyed.

Upon receipt of the calling signal 108 with the callback number, the called terminal 11 extracts the caller and callback numbers to show them on the display screen 56, FIG. 5. The display allows the called party A to have a time to decide whether or not he/she will answer the phone depending on the displayed information even when he/she stays thereabound to answer the phone right now. In that case, the calling terminal 11 registers the caller and callback numbers thus extracted from the calling signal 108 regardless of whether or not the called party A goes off-hook the phone.

If the called party A wants to make a callback later on after the call has terminated thereon, he/she brings up the list of call events on the incoming-call history on the display 56 and moves the cursor on the call event in question on the incoming-call history to thereby instruct the called terminal 11 to originate a call. The called terminal 11 in turn sends out a calling signal containing the callback number as a destination number, or the FMC service number (FMC one-number), included in the call event on the incoming-call history.

The telephone switch 14 receives the calling signal indicative of the called number, i.e. FMC service number, and supplies the FMC service number to the application server 15 to retrieve therefrom the phone number of the terminal 12 or 13 to which the subscriber B wishes at this time to establish a callback connection. The switch 14 then changes or converts the called number in the calling signal to the derived number, i.e. ultimate destination number and transmits the signal 108 to the called terminal 11.

Consequently, if presence information on the user B currently indicates that the user B uses the terminal 13 after having originated the call from the calling terminal 12 to the called terminal 11, a calling signal of the callback from the user A is transferred to the terminal 13, rather than the terminal 12, thereby allowing the user B to be reached.

It is to be noted that, the called party A can register in the address book of the called terminal the information on the caller and callback numbers included in the received calling signal. The address book registration is similar to a conventional solution, but the subject of the registration in the illustrative embodiment also includes the callback number.

In this way, the phone number for callback is inserted in the calling signal in addition to the caller number to make a called terminal carry out a callback to the callback number thus inserted. It is therefore possible to increase the possibility of reaching the caller more than ever.

Furthermore, a authentication process executed on the callback number by the telephone switch 14 controls unauthorized use of the service of allowing the user to set the callback number in addition to the caller number.

Well, an alternative embodiment of the caller information notifier system in accordance with the present invention will now be described in detail with reference to FIGS. 6, 7 and 8. The caller information notifier system in this alternative embodiment is also applicable to the FMC service system for providing the one-number service.

In the embodiment shown in and described with reference to FIG.1, a callback number is inserted into a calling signal to be delivered to a called terminal, thereby allowing the called terminal to retrieve the callback number. In the alternative embodiment, however, the called terminal obtains the callback number by requesting a telephone switching system to supply the callback number.

Figure 6:
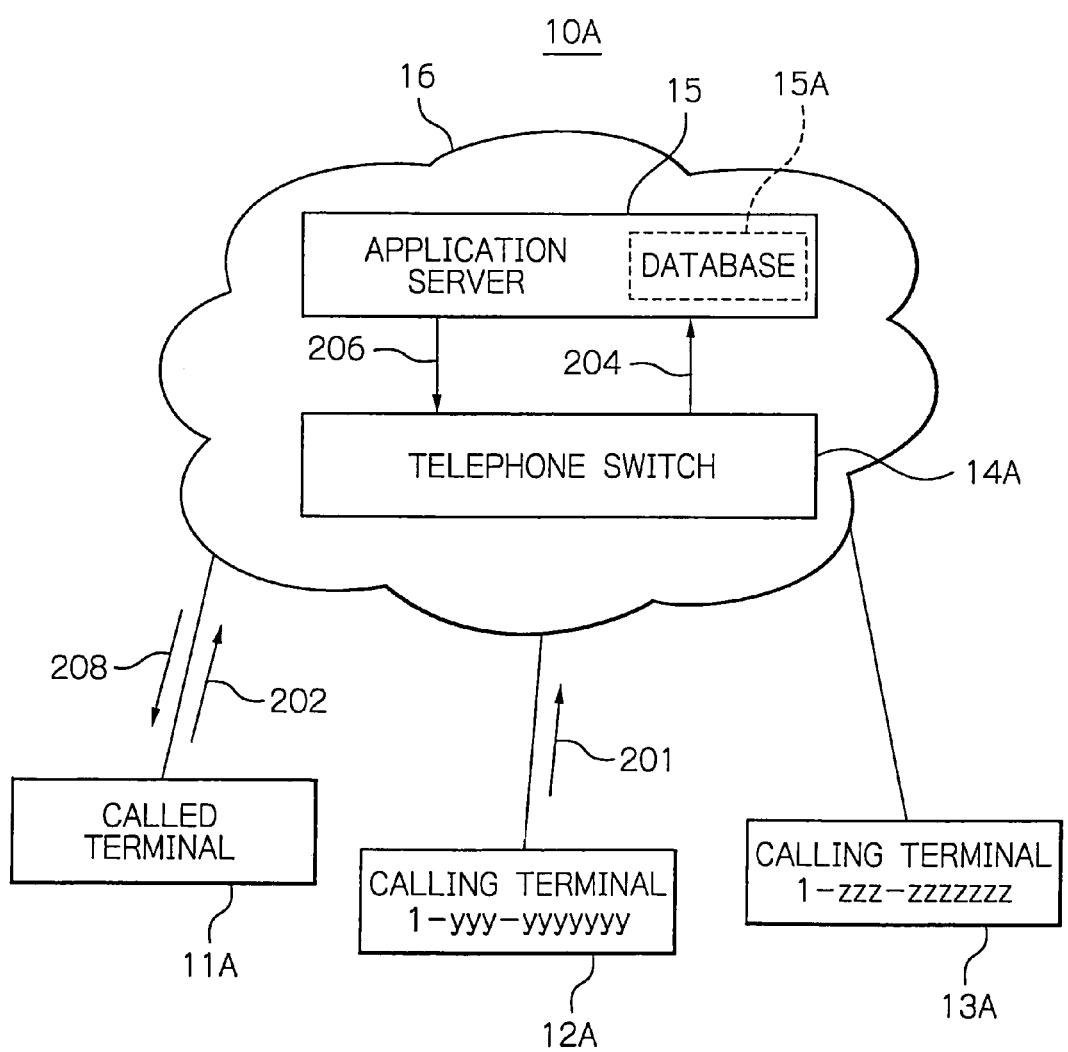
FIG. 6 is a schematic system diagram, like FIG. 1, showing an example of FMC service system implementing a caller information notifier system in accordance with an alternative embodiment of the present invention together with a flow of information in the system.

FIG. 6 is a schematic system diagram showing an FMC service system 10A implementing a caller information notifier system in accordance with the alternative embodiment, together with a flow of information in the system. Like constituent elements or components are designated with the same reference numerals.

In the FMC service system 10A of the alternative embodiment, the situation is almost the same as the system 10 shown in FIG. 1 so that there are a called terminal 11A, calling terminals 12A and 13A, a telephone switching system 14A and the application server 15.

The calling terminals 12A and 13A may work as conventional ones, i.e. having telephonic functions such as dialing, call control and speech circuitry. In accordance with the alternative embodiment, for example, a calling signal 201, FIG. 6, sent out from the calling terminal 12A simply contains a caller number, e.g. "1-yyy-yyyyyyy" but not a callback number. Therefore, the called terminal 11A is adapted to acquire only a caller number as a number associated with the incoming-call history.

Figure 7:
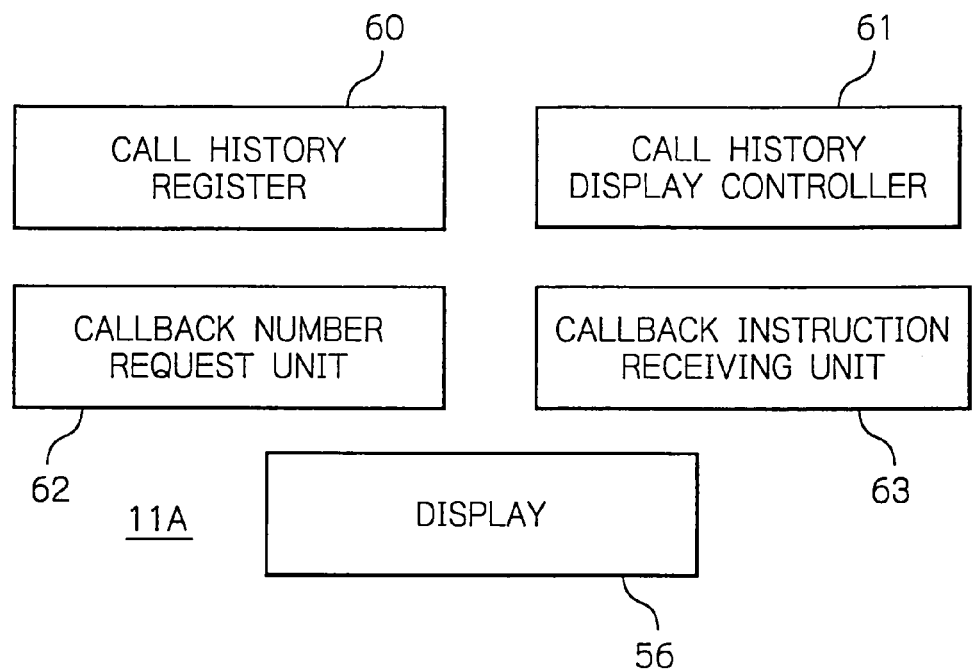
FIG. 7 is a schematic block diagram showing the internal functions of a called terminal in terms of acquiring a callback number in the alternative embodiment shown in FIG. 6.

FIG. 7 is a schematic block diagram showing the internal structure of the called terminal 11A in terms of acquiring a callback number in the alternative embodiment. In this figure, the called terminal 11A comprises a call history register 60, a call history display controller 61, a callback number request unit 62 and a callback instruction receiving unit 63.

The call history register 60 is adapted to, for example, keep a predetermined number of call events on an incoming-call history. In the alternative embodiment, each call event on the incoming-call history, except call events showing the blockage of caller IDs, includes a caller number, but not a callback number unlike with the call history in the embodiment shown in FIG. 1.

The call history display controller 61 is responsive to a request of the called user A for displaying a list of call events or the latest call event on the incoming-call history to display the list or the latest event. On the display screen 56 showing the call events, a cursor, not shown, points to any one of call events, and the call history display controller 61 is responsive to a cursor shift action to shift the cursor accordingly from the call event currently pointed on the incoming-call history to another.

The callback number requesting unit 62 is operable to detect that a callback number request is made by the called user A during displaying the list of call events on the incoming-call history, and then send out a callback number request signal to the telephone switch 14A. The callback number request signal may conform to a format predefined between the switch 14A and telecommunications terminals, e.g. a SIP SUBSCRIBE request can be used. Furthermore, the callback number request signal includes a caller number that the cursor pointed on the list of call events on the incoming-call history. The callback number requesting unit 62 is also operable, when a callback number is supplied from the telephone switch 14A, to display the supplied callback number in place of or in addition to the caller number included in the list of call events on the incoming-call history. In the former case, a marker is also indicated on the display screen 56 to signify that the displayed number is the callback number.

The callback instruction receiving unit 63 is responsive to an instruction to originate a call with a call event specified on the incoming-call history by, e.g. positioning the cursor on a specific call event on the incoming-call history or selecting the latest call event on the incoming-call history to supply the call controller, not shown, of the terminal 11A with a telephone number to be dialed. The callback instruction receiving unit 63 develops as a number to be dialed a callback number or a caller number if the call event specified on the incoming-call history contains or does not contain a callback number, respectively.

Furthermore, the callback instruction receiving unit 63 may be adapted to execute a procedure to shift to the address book registering operation, as with the incoming-call history display controller 54 in the embodiment shown in FIG. 5.

Figure 8:
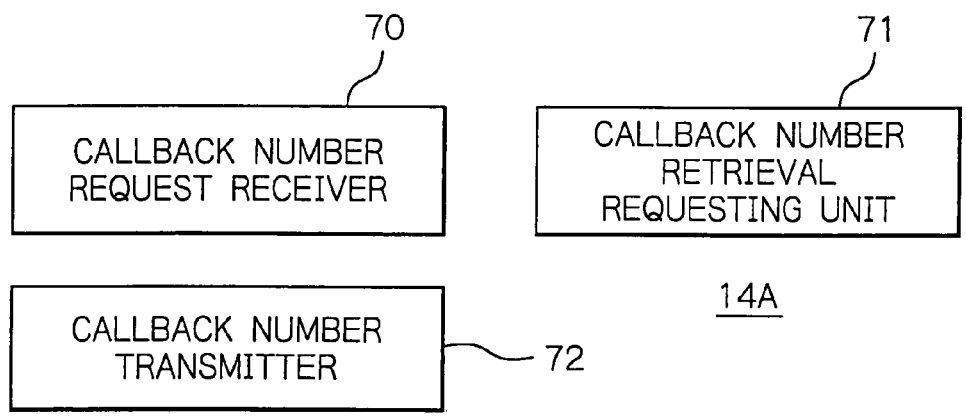
FIG. 8 is a schematic block diagram showing the internal functions of a telephone switch in terms of acquiring the callback number in the alternative embodiment.

FIG. 8 is a schematic block diagram showing the internal structure of the telephone switching system 14A in terms of acquiring a callback number in the alternative embodiment. In this figure, the telephone switch 14A comprises a callback number request receiver 70, a callback number retrieval requesting unit 71 and a callback number transmitter 72.

The callback number request receiver 70 is adapted to recognize a callback number request signal among various signals transmitted from various terminal devices and retrieve a caller number from the request signal to supply the caller number to the callback number retrieval requesting unit 71.

The callback number retrieval requesting unit 71 is configured to supply the caller number to the application server 15 to request retrieval of an FMC service number or FMC one-number corresponding to the caller number. The application server 15 in turn accesses the FMC service subscriber database 15A, which has data stored as shown in FIG. 4, and retrieves an FMC service number associated with the caller number to provide the obtained FMC service number to the callback number retrieval requesting unit 71.

The callback number transmitter 72 is adapted to transmit to the terminal 11A, which has sent out the callback number request signal, a request response signal that contains the callback number or FMC service number thus retrieved. The request response signal may conform to a predefined format, e.g. a NOTIFY response can be used for the above purpose.

Next, the operation of the FMC service system 10A will be described in relation to callback in accordance with the alternative embodiment. It is to be noted that the registration procedure of a prescribed number of the latest call events on the incoming-call history in the call history register 60 may be executed in the called terminal 11A in the same way as the conventional procedure, and therefore the description thereon will be omitted.

When the user A of the called terminal 11A intends to make a callback to a calling terminal, e.g. of the user B, from which a call was terminated in the not too distant past, the user A operates the called terminal 11A to make a request for displaying a list of call events or the latest call event on the incoming-call history so as to display a list of call events or the latest incoming-call event on the display screen 56, FIG. 7.

In some cases, even though the user A finds out from the call events on the incoming-call history list the phone number or past caller number he/she wants to make a callback, the user A may wonder if the user B of the phone number in question who is a subscriber of the FMC service is within reach of the terminal corresponding to the phone number in question when the user A tries to dial the phone number obtained from the call event on the incoming-call history list, or the user B may not answer the phone when the call is actually originated. Under those circumstances, the user A places the cursor at the phone number in question on the display screen 56 in the call event on the incoming-call history list to issue a request for a callback number. In response to this request, the called terminal 11A transmits to the telephone switch 14A a callback number request signal 202, FIG. 6, including a caller number "1-yyy-yyyyyyy".

Upon receipt of the callback number request signal 202, the telephone switch 14A extracts the caller number "1-yyy-yyyyyyy" from the callback number request signal 202, and then feeds the extracted number to the application server 15 to request the server 15 to retrieve an FMC service number or FMC one-number associated with the caller number, as depicted with a connection 204 in FIG. 6. The application server 15 in turn accesses the FMC service subscriber database 15A to retrieve an FMC service number, e.g. "1-xxx-xxxxxxx", corresponding to the caller number and gives the acquired number to the telephone switch 14A, as shown with a connection 206. The switch 14A then sends back a request response signal 208 containing the callback number or FMC service number "1-xxx-xxxxxxx" to the terminal 11A that sent the callback number request signal 202.

When the callback number is supplied from the telephone switch 14A, the called terminal 11A displays on the display screen 56 the received callback number "1-xxx-xxxxxxx" in place of or in addition to the caller number "1-yyy-yyyyyyy" listed in the call history.

When the callback number is displayed, the user A may then instruct the called terminal 11A to originate a call meant for the callback number, and the terminal 11A in turn supplies the callback number as a destination phone number to its call controller, not shown, to send out a calling signal.

In this way, a telephone number for callback is derived from the telephone switching system 14 by using the caller number contained in a calling signal as a key to place a callback. The possibility of reaching a caller can be more increased.

With respect of the illustrative embodiments, various modifications have been described above. In addition to those modifications, further modifications can be implemented as discussed below.

In accordance with the illustrative embodiment shown in and described with reference to FIG. 1, the calling terminal inserts a callback number in to a calling signal. Alternatively, the telephone switching system may implement the callback number insertion. For example, the calling signal may include mere information on an intention of inserting a callback number, or the telephone switching system may be set to execute a callback number insertion service, and when the telephone switching system receives the calling signal, the switching system retrieves an FMC service number or FMC one-number of the caller from the application server to insert the obtained number into the calling signal. In this case, the authentication procedure described before is not required. Moreover, a callback number to be inserted may be optionally set to the telephone switching system.

Furthermore, in the embodiment shown in FIG. 1, the calling terminal is adapted to insert a callback number into a calling signal, but the caller user B maybe allowed to select whether to insert a callback number into a calling signal on a call-by-call basis.

In accordance with the alternative embodiment shown in FIG. 6, the called terminal retrieves a callback number at the request of a called user. Alternatively, the called terminal may be adapted to automatically retrieve a callback number. By way of example, the called terminal starts to automatically retrieve a callback number when a phone call is disconnected, or in the case where the called party does not answer a call although the ringer of the called terminal sounds and then the caller goes on-hook.

The above embodiments are applied to the FMC service system providing the one-number service, but the present invention is not specifically limited to the FMC service system. In other words, the callback number is not restricted to the FMC service number. For instance, the system may be adapted to allow the user B to set a callback number at will by an operation similar to setting a call-forwarding number to a telephone switching system. Moreover in the present invention, the protocol for use in providing services for callback is not restrictively comprehended to the SIP.

Furthermore, the called terminal visually displays a callback number on its display screen in the above-described embodiments. Alternatively, different display methods can be employed. For example, a callback number may audibly, e.g. in synthetic speech.

The above embodiments employ the telephone switches 14 and 14A separately provided from the application server 15. The present invention is not limited to the specific embodiments, but any types of server are applicable to implementing the integrated functions of the telephone switch and the application server collaboratively.

The entire disclosure of Japanese patent application No. 2008-209801 filed on Aug. 18, 2008, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A caller information notifier system for use in a telecommunications network, the network including a calling terminal on which a call originates and a called terminal on which the call terminates, comprising:
    a callback number notifier, disposed in the calling terminal, for notifying the called terminal of a phone number for callback that differs from a phone number of the calling terminal; and
    a callback number insertion flag setter disposed in the calling terminal for setting a callback number insertion flag to an ON or OFF state, wherein
    the callback number notifier checks the state of the callback number insertion flag, and inserts the phone number for callback into a calling signal and sends out the calling signal when the state of the callback number insertion flag is ON.

2. The system in accordance with claim 1, wherein said telecommunications network comprises a communication network server through which the calling signal passes, said server comprising a callback number authenticator for authenticating the phone number for callback inserted in the calling signal.

3. The system in accordance with claim 1, wherein said telecommunications network comprises a communication network server, said callback number notifier being provided to said server,
    said called terminal sending a callback number request signal containing the phone number of the calling terminal to derive the phone number for callback from said callback number notifier.

4. The system in accordance with claim 1, wherein said called terminal comprises an address book registering circuit for registering in an address book information on the phone number for callback automatically included.

5. A communications terminal for use in a telecommunications network for transmitting a calling signal, comprising:
    a callback number insertion flag setter for setting a callback number insertion flag to an ON or OFF state;
    a call signaling unit for checking the state of callback number insertion flag; and
    a callback number inserting circuit for inserting into the calling signal a phone number for callback that differs from a phone number of said communications terminal when the state of the callback number insertion flag is ON.

6. A communications network server for use in a telecommunications network for passing a calling signal, comprising a callback number authenticator for determining a relation between a phone number of a terminal which sent out the calling signal and a phone number for callback, when inserted in the calling signal, to authenticate the phone number for callback.

7. A communications terminal for use in a telecommunications network for receiving a calling signal, comprising a callback number holding circuit for retrieving a phone number for callback, when inserted in the calling signal, to hold the retrieved number as a phone number for callback.

8. A method of notifying caller information in a telecommunications network, the network including a calling terminal on which a call originates and a called terminal on which the call terminates, the method comprising the steps of:
    originating a call by the calling terminal to the called terminal;
    terminating the call on the called terminal;
    disconnecting the call without answering;
    notifying the called terminal of a phone number for callback that differs from a phone number of the calling terminal;

checking a state of a callback number insertion flag set by a callback number insertion flag setter; and inserting the phone number for callback into a calling signal and sending out the signal by the calling terminal when the state of the callback number insertion flag is ON.

9. The method in accordance with claim 8, further comprising the steps of:

passing the calling signal through a communication network server provided in the telecommunications network; and authenticating the phone number for callback inserted in the calling signal by a callback number authenticator provided in the server.

10. The method in accordance with claim 8, further comprising the steps of:

sending a callback number request signal containing the phone number of the calling terminal by the called terminal; and deriving the phone number for callback from a communication network server provided in the telecommunications network.

11. The method in accordance with claim 8, further comprising the step of registering information on the phone number for callback automatically included in an address book included in the called terminal.

\* \* \* \* \*